(12) United States Patent
Acord (10) Patent No.: US 7,077,628 B1
(45) Date of Patent: Jul. 18, 2006

(54) WIND MACHINE WITH INDEPENDENT FABRIC

(76) Inventor: Robert J. Acord, 1210 Maple St., Neenah, WI (US) 54956

( * ) Notice: Subject to any disclaimer, the term of this patent is extended or adjusted under 35 U.S.C. 154(b) by 58 days.

(21) Appl. No.: 10/822,264

(22) Filed: Apr. 12, 2004

(51) Int. Cl.
B64C 11/00 (2006.01)
(52) U.S. Cl. .................. 416/1; 416/132 B; 416/132 A; 415/4.2; 415/907
(58) Field of Classification Search ............ 416/132 B, 416/1, 110, 120, 132 A; 415/4.2, 4.4, 907; 290/44, 55; 442/2, 50
See application file for complete search history.

(56) References Cited

U.S. PATENT DOCUMENTS

| 23,932 | A | 5/1859 | McAllister |
| 41,442 | A | 2/1864 | Morse |
| 1,111,350 | A | 9/1914 | Bayley |
| 1,364,681 | A | 1/1921 | Barto |
| 1,753,302 | A | 4/1930 | Ramm |
| 2,006,024 | A | 6/1935 | Lockwood |
| 2,129,652 | A | 9/1938 | Dean |
| 3,920,354 | A | 11/1975 | Decker |
| 4,000,344 | A | 12/1976 | Dilbey |
| 4,134,710 | A | 1/1979 | Atherton |
| 4,191,507 | A | * | 3/1980 | DeBerg ................ 416/117 |
| 4,408,955 | A | 10/1983 | Wagle et al. |
| 4,649,284 | A | 3/1987 | Hsech-Pen |
| 4,684,817 | A | 8/1987 | Goldwater |
| 5,525,037 | A | 6/1996 | Cummings |
| 6,345,944 | B1 | * | 2/2002 | Florence ............... 410/118 |
| 6,413,038 | B1 | * | 7/2002 | Lord ..................... 415/4.2 |
| 6,853,096 | B1 | * | 2/2005 | Yu et al. ................ 290/55 |
| 6,926,491 | B1 | * | 8/2005 | Migler ................... 415/4.4 |
| 2002/0187038 | A1 | 12/2002 | Streetman |

FOREIGN PATENT DOCUMENTS

GB 2 048 391 12/1980

* cited by examiner

Primary Examiner—Edward K. Look
Assistant Examiner—Nathan Wiehe
(74) Attorney, Agent, or Firm—Ryan Kromholz & Manion, S.C.

(57) ABSTRACT

A wind machine comprises a plurality of fabrics that are removeably installed on a rotatable carrier. The carrier axis of rotation may be either horizontal or vertical. The carrier has pairs of first and second arms that support opposite ends of a fabric net. Side strands of the net may be reinforced. Each net has a loop that is supported on one carrier arm and a piece of material that is supported on the second carrier arm. The fabric piece of material has holes that receive associated studs on the carrier second arm, which is turnable. By turning the carrier second arm, a tension is imparted to the fabric. The carrier second arm is lockable to maintain the tension. Multiple panels are connected to the net for pivoting between closed and open positions. The panels resist the wind when they are in the closed position.

33 Claims, 5 Drawing Sheets

WIND MACHINE WITH INDEPENDENT FABRIC

BACKGROUND OF THE INVENTION

1. Field of the Invention

The present invention pertains to energy conversion, and more particularly to apparatus that converts wind energy into mechanical or electrical energy.

2. Description of the Related Art

It has long been known to harness the wind to perform useful work. For example, sailboats and water-pumping windmills have been in use for centuries.

Many wind powered machines utilize blades that are fixed to a supporting frame. Those types of machines typically have an axis of rotation for the blades and frame that is generally parallel to the direction of wind flow. In that case, the blades rotate in a plane that is perpendicular to the direction of the wind. Another type of wind machine utilizes a frame that rotates about an axis that is perpendicular to the wind direction. In that type of machine, the blades are not fixed to the supporting frame. Rather, the blades pivot such that the wind strikes the blades' full areas so as to push the blades against the frame when the blades move in the same direction as the wind. The blades pivot such that the wind passes through them when the blades move in the opposite direction as the wind.

Some specific applications of prior attempts to convert wind energy into mechanical energy by using pivotable blades may be seen in U.S. Pat. Nos. 23,932; 41,442; 1,753,302; 2,006,024; 2,129,652; 4,408,955; and 4,649,284. U.S. patent publication 2002/0187038 shows similar apparatus. U.S. Pat. Nos. 4,134,710 and 5,525,037 disclose prior machines that convert wind energy into electricity.

U.S. Pat. No. 3,920,354 teaches a wind machine in which the blades are hinged to a series of mutually perpendicular wires. In turn, the wires are part of a frame that rotates about an axis of rotation. A similar design is shown in U.S. Pat. No. 4,684,817 and United Kingdom patent application GB2048391. The wire and blade design of the two foregoing U.S. patents and the United Kingdom patent application suffer the disadvantage of having the wires integral with the frame. That is, the ends of the wires are permanently fixed directly to the associated machine frame component. Consequently, the assembly of the blades to the wires can be achieved only in the presence of the frame. Such assembly is often awkward. Further, if a blade or wire is damaged, the entire machine is out of operation while repairs are made.

Thus, a need exists for improvements to wind machines.

SUMMARY OF THE INVENTION

In accordance with the present invention, a wind machine is provided that includes a fabric that is independent of a machine carrier. This is accomplished by apparatus that includes a net that is removably supported on the carrier and multiple panels pivotally connected to the net.

The wind machine comprises a frame having a base in which the carrier rotates. A preferred carrier has at least three pairs of arms. The pairs of arms are preferably spaced equiangularly about a carrier axis of rotation. At least one arm of each pair is turnable and lockable relative to the rest of the carrier. On the turnable arm are a number of studs.

The fabric net is made with a number of first strands that intersect a number of second strands. Preferably, the first and second strands are perpendicular to each other and are joined at their intersections. A suitable material for the net is a flexible plastic. In that situation, the intersections of the strands may be heat welded to each other.

The fabric net may have a variety of shapes such as circular, triangular, or rectangular. The net periphery is designed to be removably supported on the carrier. For a rectangular net, for instance, at least two opposed ends are constructed to be supported on the carrier. Opposed sides of the net may be either supported or unsupported on the carrier.

According to one aspect of the invention, one of the ends of the fabric net is provided with a loop. The loop may be a separate piece of flexible material. Alternately, the net may be doubled over onto itself into a loop and overlapping strands joined to each other. On the other end of the net is flat piece of cloth or other flexible material. The cloth piece has a number of holes in it, which may be reinforced with grommets. The strands at the second sides of the net may be stiffened by using thicker strands or double strands.

The panels of the invention are made from any of a wide variety of materials such as plastic or metal. The panels may be rectangular in shape, but the particular shape is not critical to the operation of the invention. The panels are thin in relation to their lengths and widths.

A first edge of each panel is pivotally connected to a strand of the net. The connection may be on either a first strand or on a second strand. In the preferred embodiment, the panels are arranged in rows on the net, with several relatively small panels being connected along a particular common strand to make a row. The panels of one row may partially overlie the panels of an adjacent row. The pivotal connections may consist of one or more tabs along the panel first edge. The tab is bent over to capture the associated strand and to lie in flat facing contact with a panel plate section. Other pivotal connections such as clips, clasps, and hinges are also acceptable. By means of the pivotal connections, the panels are free to pivot between open and closed positions on the net. In the closed position, the panels lie alongside the net. In the open position, the panels are approximately 90 degrees to the closed position.

The fabrics are installed on the carrier by sliding the net loop over one arm of a pair. The grommets on the net cloth piece are slipped over the studs on the turnable arm of the pair. The two carrier arms are spaced apart such that the fabric lies in a generally flat plane. The carrier turnable arm is turned to impart a desired tension on the fabric, and the arm is locked in place.

At least three fabrics of the invention are installed on the carrier of the wind machine. In one embodiment of the invention, the carrier is journalled in the base for rotating about a vertical axis. The fabrics are oriented in a generally vertical plane with the net: first strands being generally horizontal and the net second strands being generally vertical. In that situation, the panels initially hang down by gravity alongside the net in the closed position if the panels are pivotally connected to the first strands.

The wind machine is placed out of doors in the path of wind. Regardless of its direction, the wind forces the panels on at least one first fabric to the closed position against the associated net. Simultaneously, the wind forces the panels of at least one second fabric to the open position. The force of the wind on the closed panels tends to cause the first fabric to move in the downstream direction. The open panels on the second fabric present only negligible resistance to the wind. As a result, the carrier rotates about its axis, with the first fabric moving in the downstream direction, and the second fabric moving in the upstream direction. As the carrier rotates, the fabrics remain vertically oriented, and the panels alternately open and close as the corresponding fabrics move upstream and downstream, respectively, relative to the wind. The rotating frame is connected to a device that converts the wind energy acting through the carrier into mechanical or electrical energy.

In a modified embodiment of the invention, the wind machine carrier rotates about a horizontal axis. The operation of the machine with the horizontal axis of rotation is generally similar to that of the machine with the vertical axis of rotation. The only significant difference is that the planes of the fabrics change between vertical and horizontal as the carrier rotates.

Should a fabric need repair or replacement, it is removed from the wind machine carrier by releasing the tension on the fabric. A new fabric is installed and tensioned, and the wind machine is quickly back in operation. In that manner, unproductive downtime is minimal.

The method and apparatus of the invention, using fabrics having pivotable panels, thus enables a wind machine to convert wind energy into mechanical or electrical energy. The fabrics are removable from the carrier, thereby enhancing the versatility and productivity of the wind machine.

Other advantages, benefits, and features of the invention will become apparent to those skilled in the art upon reading the detailed description of the invention and studying the drawings.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figures 1, 1A, 5:
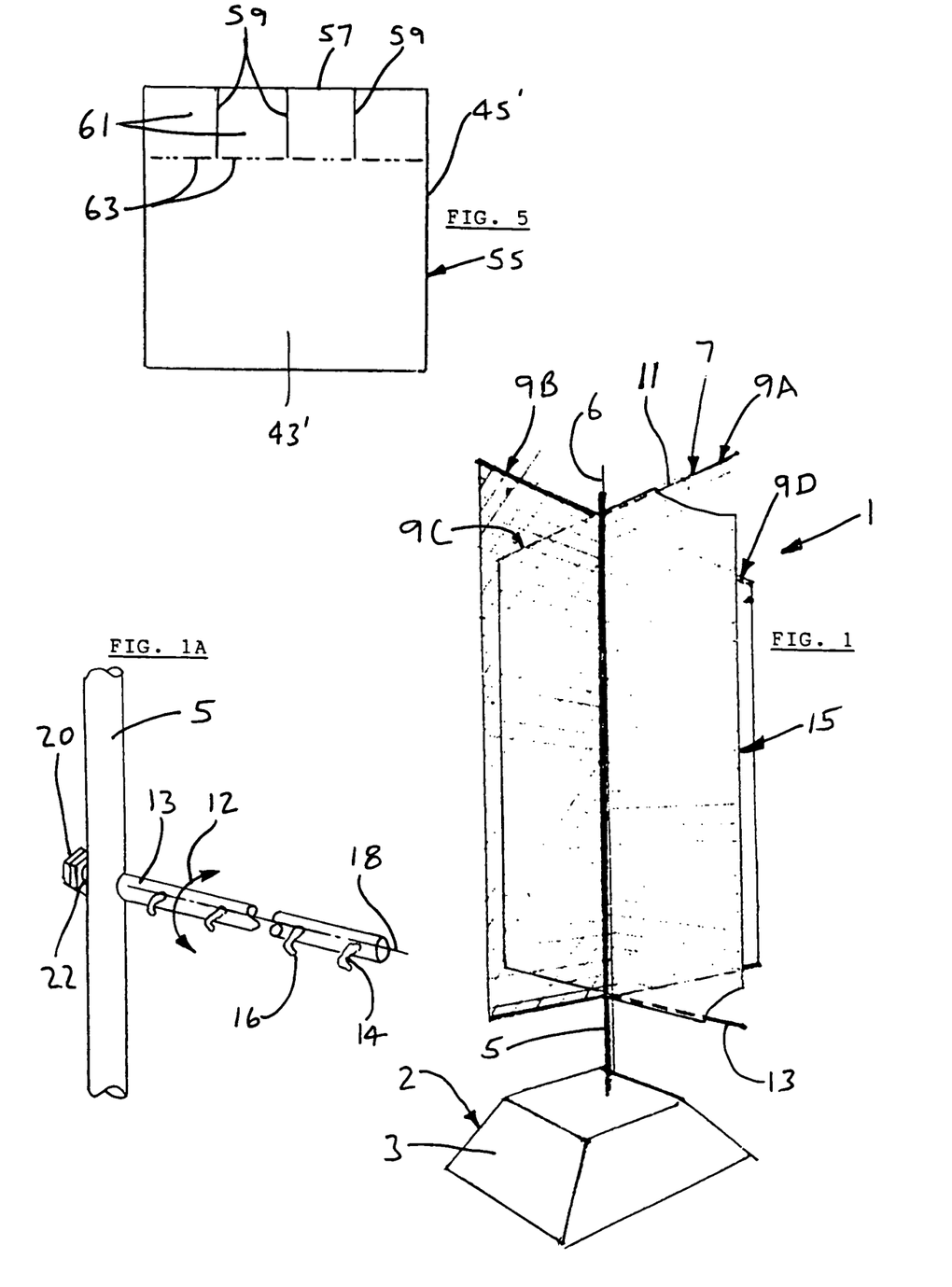
FIG. 1 is a perspective view of the wind machine of the present invention.
FIG. 1A is a perspective view on an enlarged scale showing a portion of a bottom arm of the wind machine of the invention.
FIG. 5 is a front view of a modified panel of the fabric used with the wind machine of the present invention.

Looking at FIG. 1, a wind machine 1 is illustrated that includes the present invention. The wind machine 1 is particularly useful for converting wind energy into mechanical or electrical energy. However, it will be understood that the invention is not limited to power conversion applications.

The particular wind machine 1 illustrated is comprised of a frame 2 having a base 3 and a carrier 7. The carrier 7 includes an upstanding shaft 5 journalled in the base 3 for rotation about a vertical axis 6. The particular carrier illustrated is in the form of four pairs 9A, 9B, 9C, and 9D of arms extending from the shaft 5 and equiangularly spaced about the shaft axis 6. It will be appreciated, of course, that any number of pairs of arms greater than two is acceptable, but the arms should be equiangularly spaced. Each pair 9A, 9B, 9C, and 9D of arms consists of a fixed arm, such as top arm 11, and a turnable arm, such as bottom arm 13. Along each bottom arm 13 are a number of short studs 14, FIG. 1A. The free ends 16 of the studs 14 may be hooked. The bottom arms are turnable in the directions of arrows 12 about their respective longitudinal centerlines 18 relative to the shaft 5, and the arms are lockable to the shaft at a desired angular orientation. In FIG. 1A, double nuts 20 are used on threaded ends 22 of the bottom arms to lock the arms in place. Other locking devices, such as a ratchet or a set screw, may also be used to lock the arms in place.

Installed on the carrier 7 are multiple fabrics 15. Each fabric 15 is removably installed on one pair 9 of carrier arms. Specifically, one fabric is installed between the top and bottom arms 11 and 13, respectively, of each pair of arms. Thus, the wind machine 1 utilizes four fabrics.

Figure 2:
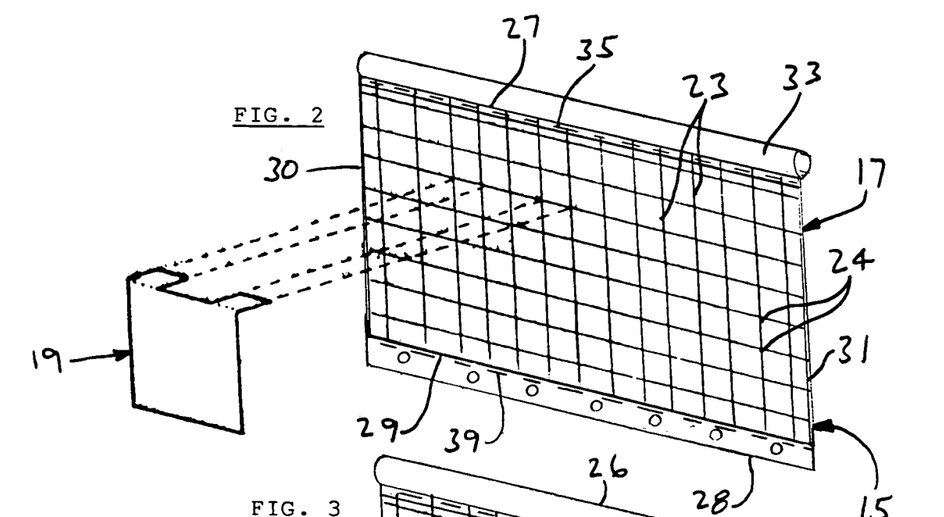
FIG. 2 is an exploded perspective view of a portion of a typical fabric used with the wind machine of the invention at a first stage of assembly.
Figure 3:
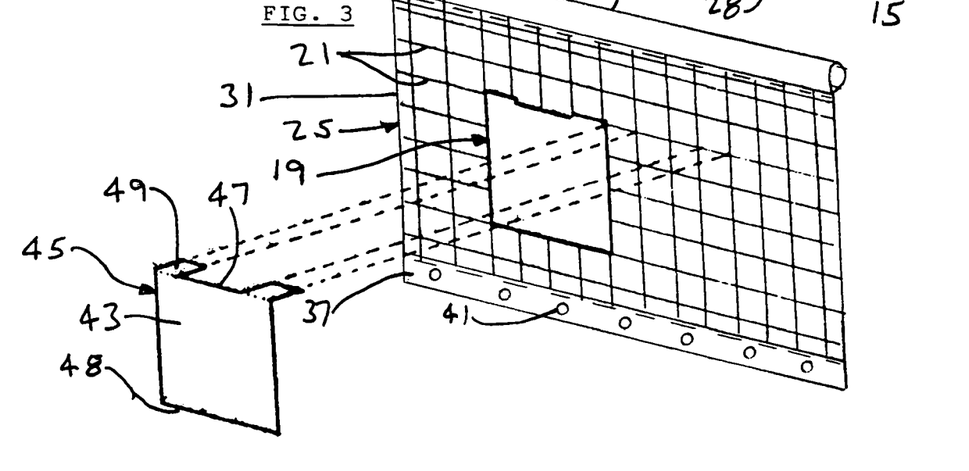
FIG. 3 is an exploded perspective view of the fabric of FIG. 2 at a subsequent stage of assembly.

Turning to FIGS. 2 and 3, each fabric 15 is composed of a net 17 and a large number of panels 19. The net 17 is preferably made from a flexible weather impervious material, such as plastic or stainless steel wire. The net has a large number of horizontal intermediate strands 21 that intersect and are joined to a number of vertical intermediate strands 23 at junctions 24. For example, plastic strands 21 and 23 may be heat welded at the junctions 24. The spacings between the strands is not critical. Typical spacings range from about one-fourth inch to over four inches.

The net 17 is bounded by a periphery 25. The periphery 25 may be any practical geometric shape such as circular or triangular. In the particular fabric 15 shown, the net has a rectangular periphery. The net thus has a top end 26, a bottom end 28, and opposite sides 30. At: the net top end 26 is a top strand 27. The net also has a bottom strand 29 and opposed side strands 31.

It is an important feature of the invention that the fabric 15 is easily installed onto and removed from the wind machine carrier 7. For that purpose, the net 17 is constructed with a loop 33 along one of the ends 26 or 28. In the preferred embodiment, the loop 33 is along the top end 26. The loop 33 overlaps the top strand 27, and it may overlap one or more intermediate strands 21. As illustrated, the loop 33 is a long continuous loop between the side strands 31. However, several short loops may be used instead of one long loop without departing from scope of the invention. The loop may be made from any suitable material, such as a plastic material. However, I prefer a woven cloth material for the loop. The cloth material is attached to the net in any convenient way, such as by being sewn to itself along one or more stitch lines 35.

Along the net end opposite the loop 33 is a flat piece 37 of cloth or similar flexible material. The cloth piece 37 is shown at the net: bottom end 28. In that case, the cloth piece 37 overlaps the bottom strand 29, and, if desired, one or more intermediate strands 21. The piece 37 is attached to the net by sewing along one or more stitch lines 39 or other suitable way. In the piece 37 are a number of holes with associated grommets 41. Preferably, the side strands 31 are thicker than the top, bottom, and intermediate strands.

Alternately, the side strands may be the same thickness as the other strands but doubled.

In the illustrated construction, the panels 19 are constructed with a plate section 43 bounded by a rectangular periphery 45. It will be appreciated, of course, that the periphery 45 may be of different shapes, such as triangular or circular. On one edge 47 of the plate section periphery are a pair of spaced apart tabs 49. The tabs 49 are preferably integral with the plate section. The panels may be made from a variety of materials, such as plastic or metal. The material is thin in relation to the plate section length and width.

For the fabric 15 of FIGS. 2 and 3, the panels 19 are assembled to the net 17 by placing the panel plate sections 43 in flat facing contact with the net. The panel tabs 49 are bent over in line with the edge 47 to capture a horizontal strand 21 between the tabs and the plate section. The tabs are bent so as to come into flat facing contact with the panel plate section, and the tabs are affixed to the plate section, such as with an adhesive. The panels are relatively small in comparison with the area of the net, and several panels are connected to a particular strand. The panels are arranged in rows. For instance, in FIG. 4 one row R1 of panels 19A are connected to the net strand 21A, and a second row R2 of panels 19B are connected to the net strand 21B. The panels of one row, such as the panels 19B of row R2, may partially overlie the panels of the adjacent row, such as the panels 19A of row R1. If desired, however, the panels may be arranged such that edges 48 of the panels of one row are aligned with the edges 47 of the panels of the adjacent row.

Figure 6:
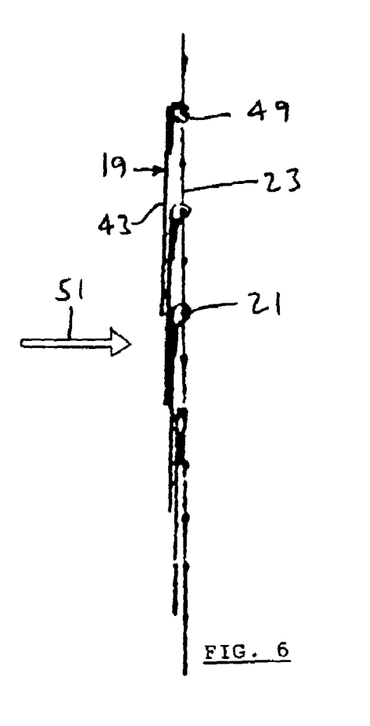
FIG. 6 is a side view of a portion of the fabric with the panels thereof in a closed position.
Figure 7:
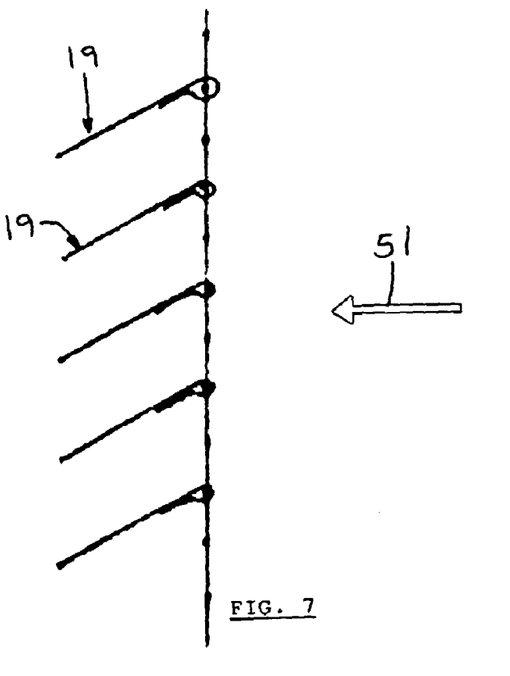
FIG. 7 is a side view of a portion of the fabric with the panels thereof in an open position.

The panels 19 normally hang generally vertically by gravity from the tabs 49 and lie in closed positions alongside the net 17. Also see FIG. 6. The panels are pivotable about the net strands 21 to an open position as shown in FIG. 7, which is approximately 90 degrees to the closed position. As many panels are assembled to the net as needed to cover substantially the entire area of the net.

Figure 4:
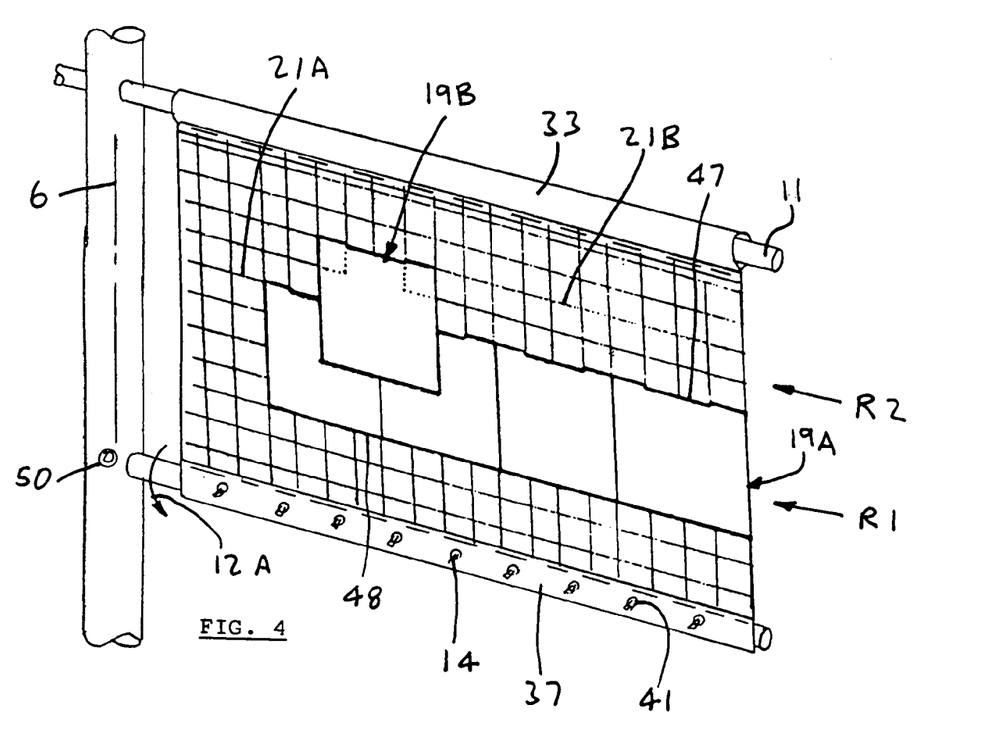
FIG. 4 is a perspective view of a partially assembled fabric installed on the wind machine of the invention.

The fabric 15 is installed on the carrier 7 by supporting the net 17 on a pair 9 of carrier arms such that the fabric lies in a generally flat plane. The net loop 33 is slid over the top arm 11 of a pair of arms. See FIG. 4. The grommets 41 in the fabric piece 37 are aligned with and placed over respective studs 14 in the bottom arm 13. The bottom arm is turned in the direction of arrow 12A such that the studs cooperate with the top arm to impart a tension on the fabric. The bottom arm is locked in place. In FIG. 4, a set screw 50 is shown as locking the bottom arm, but the double nuts 20 of FIG. 1A or other means such as a ratchet may also be used. The installation process is repeated for all the fabrics and associated pairs of arms of the carrier.

When all the fabrics 15 have been installed on the carrier 7, the wind machine 1 is complete and ready for operation. Looking at FIGS. 6 and 8, it will be assumed that the wind is blowing in the direction of arrow 51, which is perpendicular to the plane of the fabric on the carrier arm pair 9A. In that case, the wind 51 forces the closed panels 19 against the net 17 of the fabric on the pair 9A of arms. Simultaneously, the wind forces the panels on the fabric on the pair 9C of arms to pivot in the direction of the wind to their open positions, FIG. 7. The wind thus passes through the fabric on the arm pair 9C with but minor resistance. The wind has little if any effect on the fabrics installed on the pairs 9B and 9D of arms.

Figure 8:
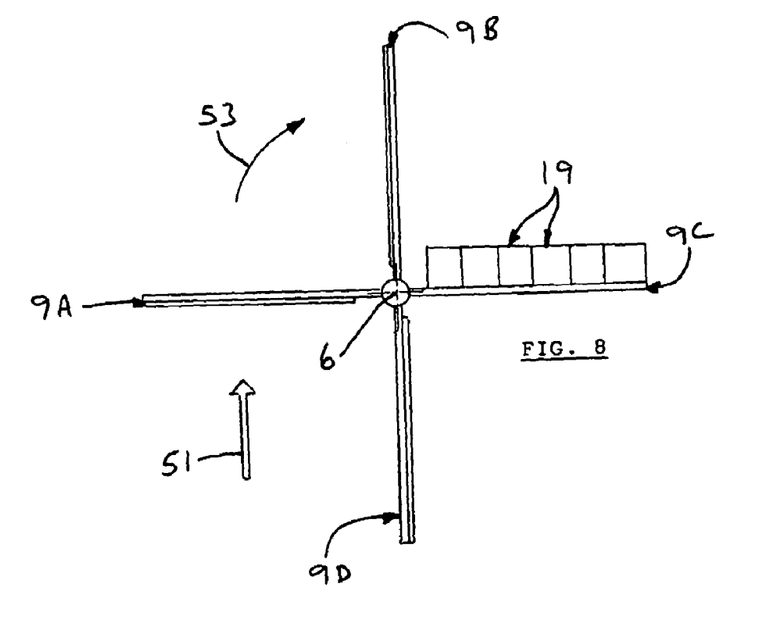
FIG. 8 is a top view of the wind machine in operation.

The force differential of the wind 51 on the fabrics 15 on the pairs 9A and 9C of arms causes the carrier 7 to rotate in the direction of arrow 53 about the shaft axis of rotation 6. AS the carrier rotates, arm pair 9D approaches the position shown for arm pair 9A, and arm pair 9B approaches the position shown for the arm pair 9C. The wind then blows against the closed panels 19 on the arm pair 9D. The wind blows the panels to their open positions on the arm pair 9B, and the cycle continuously repeats for all the arm pairs as the carrier rotates.

The carrier shaft 5 is connected to any of a wide variety of devices in the frame base 3 that utilize the torque available from the shaft. For instance, the shaft may geared to the armature of an electric generator. In that manner, the energy of the wind 51 is converted by the wind machine 1 into electrical energy. Known means, not illustrated, can be used to modify the raw electricity produced by the wind machine into a readily useful form.

Should a fabric 15 become worn or damaged, it is an easy task to replace it. The nuts 20, set screw 50, or other locking device is unlocked. The bottom arm 13 associated with the fabric to be removed is turned in the direction opposite arrow 12A to release the tension on the fabric. The grommets 41 are removed from the studs 14, and the loop 33 is pulled off the associated top arm 11. A new fabric is installed as described above, and the wind machine 1 is ready for further service with but minimal downtime.

Turning to FIG. 5, a modified fabric panel 55 is depicted. The panel 55 has a plate section 43' with a periphery 45' that may be circular, triangular, or, as depicted, rectangular in shape. One edge 57 of the periphery 45' is slit in a number of places with slits 59 to make a corresponding number of tabs 61. The slits 59 are spaced apart the same distance as the spacings of the net strands 21 and 23. To assemble the panels to the net 17, the tabs 61 are bent over along respective fold lines 63 to capture a net strand 21 between the tab and the plate section 43'. Then the tabs are affixed to the plate section.

Figure 9:
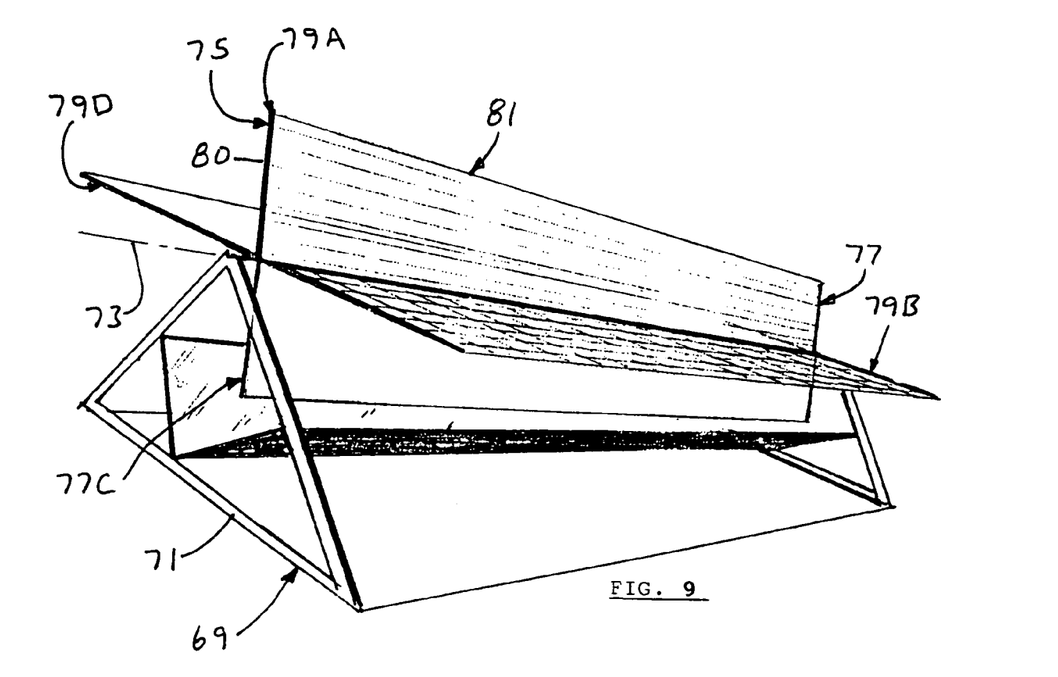
FIG. 9 is a perspective view of an alternate wind machine according to the invention.

The versatility of the present invention is further exemplified in FIG. 9. A wind machine 69 has a base 71 that defines a horizontal axis 73. A carrier 75 is free to rotate in the base 71 about the axis of rotation 73. The carrier 75 has four arm pairs 79A–79D. Each arm pair 79A–79D has at least one arm 80 that is turnable and lockable in the carrier. The arm 80 is provided with a number of studs similar to the studs 14 of the wind machine 1 described previously.

Installed on each arm pair 79A–79D is a fabric 81. The fabric 81 may be substantially similar to the fabric 15 described in connection with FIGS. 2 and 3. The fabrics 81 are installed to the carrier 75 in the same way as the fabrics 15. The planes of the fabrics 81 change between horizontal and vertical as the carrier 75 rotates. In all other respects, the operation of the fabrics 81 and the wind machine 67 are substantially similar to the operation of the fabrics 15 and the wind machine 1, respectively.

In summary, the results and advantages of wind power can now be more fully realized. The wind machine of the invention provides both a way to harness wind energy as well as versatility in the design of the machine. This desireable result comes from using the combined functions of the fabric. The same fabric functions to both resist and yield to wind forces during a cycle of the machine. The fabric panels may be constructed in a variety of ways, and the panels may be assembled to either vertical or horizontal strands of the net. The net loop and grommets cooperate with turnable and lockable machine arms and studs to render the fabrics easy to install, tension, and remove from the carrier.

It will also be recognized that in addition to the superior performance of the wind machine of the invention, its construction is such as to cost considerably less that traditional wind powered machines. The independence of the fabrics from the rest of the machine is especially beneficial.

That feature enables repair or replacement of a fabric to be made without lengthy machine downtime.

Thus, it is apparent that there has been provided, in accordance with the invention, a wind machine with independent fabrics that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A wind machine comprising:
   a. a frame including a base, and a carrier rotatable in the base about an axis of rotation, the carrier comprising a plurality of pairs of first and second arms; and
   b. a plurality of fabrics each removably installed on a respective pair of carrier first and second arms, each fabric comprising:
      i. a net comprising a multiplicity of intersecting strands and having a first end removeably supported on a carrier first arm, a second end removeably supported on a carrier second arm, and opposed sides, wherein each fabric net includes a piece of material at the second end thereof, the piece of material having a plurality of holes therein that cooperate with the carrier second arm to install and remove the fabric on the carrier, wherein the carrier second arm includes a plurality of studs, the holes in the net piece of material are placed over respective studs on the carrier second arm; and the carrier second arm is turnable and lockable to enable a tension to be imparted and maintained on the fabric; and
      ii. a plurality of panels each connected to the net for pivoting between a closed position whereat the panel is generally alongside the net and an open position whereat the panel is at approximately 90 degrees to the closed position.

2. The wind machine of claim 1 wherein each fabric net includes a loop at the first end thereof, the loop being slideable on the carrier first arm to install and remove the fabric on the carrier.

3. The wind machine of claim 2 wherein the net loop comprises a piece of flexible material attached to the fabric net.

4. The wind machine of claim 2 wherein the net loop is constructed by doubling the net over onto itself into a loop and joining overlapping net strands to each other.

5. The wind machine of claim 2 wherein the net loop is continuous between the net sides.

6. The wind machine of claim 1 wherein the fabric net comprises means for sliding over the carrier first arm.

7. The wind machine of claim 1 wherein:
   a. the carrier axis of rotation is vertical;
   b. the fabrics lie in respective planes that are generally vertical as the carrier rotates;
   c. fabric net strands consist of generally horizontal and vertical strands; and
   d. the panels are pivotally connected to the net horizontal strands.

8. The wind machine of claim 1 wherein:
   a. the carrier axis of rotation is horizontal; and
   b. the fabrics lie in respective planes that change between horizontal and vertical as the carrier rotates.

9. The wind machine of claim 1 wherein:
   a. the net strands comprise a multiplicity of generally parallel first strands;
   b. a first row of panels having at least two panels therein is pivotally connected to a selected first net strand; and
   c. a second row of panels having at least two panels therein is pivotally connected to a selected second net strand.

10. The wind machine of claim 9 wherein the panels of the second row of panels partially overlie the panels on the first row of panels when the panels are in the closed position.

11. The wind machine of claim 1 wherein:
   a. the net strands comprise a multiplicity of generally parallel first strands;
   b. each panel has a first edge with at least one tab thereon that is pivotally connected to an associated net strand, and a second edge opposite the first edge;
   c. the panels are pivotally connected to the net in adjacent rows; and
   d. the second edges of the panels of a first row of panels are generally aligned with the first edges of the panels of a second row of panels when the panels are in the closed position.

12. A wind machine comprising:
   a. a frame including a base, and a carrier rotatable in the base about an axis of rotation, the carrier comprising a plurality of pairs of first and second arms;
   b. a plurality of fabrics each removably installed on a respective pair of carrier first and second arms, each fabric comprising:
      i. a net comprising a multiplicity of intersecting strands and having a first end removeably supported on a carrier first arm, a second end removeably supported on a carrier second arm, and opposed sides; and
      ii. a plurality of panels each connected to the net for pivoting between a closed position whereat the panel is generally alongside the net and an open position whereat the panel is at approximately 90 degrees to the closed position;
   c. means for imparting a tension on the fabric wherein the means for imparting a tension comprises:
      i. a plurality of studs on the carrier second arm;
      ii. a plurality of holes in the net second end that receive associated studs on the carrier second arm;
      iii. means for turning the carrier second arm to a desired angular orientation such that a tension is imparted on the fabric between the first and second ends thereof; and
      iv. means for locking the second arm at the desired angular orientation to thereby maintain the tension on the fabric.

13. In combination:
   a. a frame comprising:
      i. a base;
      ii. a shaft that rotates in the base about an axis of rotation; and
      iii. at least three pairs of arms extending from the shaft, each pair of arms having a first arm and a second arm, wherein the carrier first arm is fixed to the shaft; the carrier second arm is turnable in the shaft; and the shaft comprises means for locking each carrier second arm at a selected angular orientation relative to the shaft; and
   b. at least three fabrics each removeably installed on a respective pair of carrier arms, each fabric comprising:
      i. a net having first and second ends removeably supported on the carrier first and second arms, respectively; and
      ii. a plurality of panels each pivotally connected to the fabric net for pivoting between open and closed positions.

14. The combination of claim 13 wherein:
   a. the carrier second arm includes a plurality of studs; and b. each fabric comprises means for cooperating with the carrier second arm studs to support the net second end on the carrier second arm.

15. The combination of claim 13 wherein:
a. the carrier second arm includes a plurality of studs; and
b. the fabric net second end defines a plurality of holes that cooperate with the studs to support the net second end on the carrier second arm.

16. The combination of claim 13 further comprising means for imparting and maintaining a tension on the fabric.

17. The combination of claim 13 wherein the net first end includes a loop that supports the fabric first end on the carrier first arm.

18. The combination of claim 13 wherein the net loop comprises a flexible piece of material attached to the net.

19. The combination of claim 13 wherein the net loop is constructed by doubling the net over onto itself in a loop and joining the net to itself.

20. The combination of claim 13 further comprising means for imparting a tension on the fabric.

21. The combination of claim 13 wherein the shaft axis of rotation is vertical.

22. The combination of claim 13 wherein the shaft axis of rotation is horizontal.

23. The combination of claim 13 wherein:
a. each fabric net is constructed of a multiplicity of vertical and horizontal strands; and
b. the panels are pivotally connected to the net horizontal strands.

24. The combination of claim 13 wherein:
a. each fabric net is comprised of a multiplicity of first strands that intersect a multiplicity of second strands;
b. multiple first panels are pivotally connected in a first row to a first selected net first strand; and
c. multiple second panels are pivotally connected in a second row to a second selected net first strand.

25. The combination of claim 24 wherein the panels of the first row thereof partially overlie the panels of the second row thereof when the panels are in the closed position.

26. In combination:
a. a frame comprising:
   i. a base;
   ii. a shaft that rotates in the base about an axis of rotation; and
   iii. at least three pairs of arms extending from the shaft, each pair of arms having a first arm and a second arm;
b. at least three fabrics each removeably installed on a respective pair of carrier arms, each fabric comprising:
   i. a net having first and second ends removeably supported on the carrier first and second arms, respectively; and
   ii. a plurality of panels each pivotally connected to the fabric net for pivoting between open and closed positions; and
c. means for imparting and maintaining a tension on the fabric, wherein the means for imparting a tension comprises:
   i. a plurality of studs on the carrier second arm;
   ii. a piece of material on the fabric net second end and received in the studs on the carrier second arm;
   iii. means for enabling the carrier second arm to turn in the shaft to a desired angular orientation such that a tension is imparted on the fabric; and
   iv. means for locking the carrier second arm at the desired angular orientation and thereby maintaining the tension on the fabric.

27. In combination:
a. a frame comprising:
   i. a base;
   ii. a shaft that rotates in the base about an axis of rotation; and
   iii. at least three pairs of arms extending from the shaft, each pair of arms having a first arm and a second arm, wherein the carrier first arm is fixed to the shaft; the carrier second arm is turnable in the shaft; the carrier second arm includes a plurality of studs; and
b. at least three fabrics each removeably installed on a respective pair of carrier arms, each fabric comprising:
   i. a net having first and second ends removeably supported on the carrier first and second arms, respectively, wherein the net first end includes a loop that supports the fabric first end on the carrier first arm; a piece of material is on the fabric net second end and receives the studs on the carrier second arm, so that the carrier second arm is turnable to a desired angular orientation to impart a tension on the fabric; and
   ii. a plurality of panels each pivotally connected to the fabric net for pivoting between open and closed positions.

28. The combination of claim 27 further comprising means for locking the carrier second arm at the desired angular orientation and thereby maintaining the tension on the fabric.

29. A method of constructing a wind machine comprising the steps of:
a. providing a base;
b. providing a carrier rotatable in the base and having a plurality of pairs of first and second arms;
c. providing the second arm of each carrier pair of arms with a plurality of studs;
d. providing multiple fabrics each having a net with first and second ends and multiple panels pivotally connected to the net; and
e. installing each fabric on a respective pair of carrier first and second arms comprising the steps of:
   i. removably supporting the net first end on the carrier first arm; and
   ii. removably supporting the net second end on the carrier second arm by receiving the studs on the carrier second arm into associated holes in the net second end; and
f. turning the carrier second arm in a first direction to a desired angular orientation and imparting a tension on the fabric.

30. The method of claim 29 wherein the step of removably supporting the net first end comprises the steps of providing a loop at the net first end, and supporting the net loop on the carrier first arm.

31. The method of claim 29 comprising the further step of locking the carrier second arm at the desired angular orientation and thereby maintaining the tension on the fabric.

32. The method of claim 31 comprising the further steps of:
a. unlocking the carrier second arm; and
b. turning the carrier second arm in a second direction opposite the first direction and thereby eliminating the tension on the fabric.

33. The method of claim 32 comprising the further steps of:
a. removing the studs from the net holes; and
b. removing the fabrics from the carrier arms.

* * * * *